United States Patent [19]
Schmidt

[11] 3,752,543
[45] Aug. 14, 1973

[54] ROLLER HAVING RETAINING END PLATE AND SEAL

[75] Inventor: Heinrich K. Schmidt, Levittown, Pa.

[73] Assignee: Roller Bearing Company of America, West Trenton, N.J.

[22] Filed: Feb. 16, 1972

[21] Appl. No.: 226,725

[52] U.S. Cl. .............................. 308/187.2, 277/94
[51] Int. Cl. ............................................ F16c 33/78
[58] Field of Search ................. 308/187.1, 187.2; 277/94, 95

[56] References Cited
UNITED STATES PATENTS

| | | | |
|---|---|---|---|
| 3,473,856 | 10/1969 | Helms | 308/187.2 |
| 2,718,441 | 9/1955 | Smith | 308/187.2 |
| 1,985,693 | 12/1934 | Robinson | 308/187.2 |
| 2,639,954 | 5/1953 | Potter | 308/187.2 |
| 2,915,345 | 12/1959 | Workman | 308/187.2 |
| 3,114,559 | 12/1963 | Miglietti | 308/187.2 |
| 3,266,856 | 8/1966 | Steinert | 308/187.1 |
| 3,348,889 | 10/1967 | Schaeffler | 308/187.2 |
| 3,409,337 | 11/1968 | Foote | 308/187.2 |
| 3,423,140 | 1/1969 | Cowles | 308/187.2 |

Primary Examiner—Charles J. Myhre
Assistant Examiner—Barry Grossman
Attorney—Joseph Gray Jackson et al.

[57] ABSTRACT

A full complement bearing roller having an improved retaining end plate and seal, suitable for a carriage roller, a mast roller, a cam roller, a track roller and the like. The outer race is combined with a roller and the outer race or the inner race has an annular groove facing toward the space between the outer and inner races. The retaining end plate is provided with a series of spring lugs which engage in the annular groove, locking the end plate against the ends of the rollers and taking the thrust of the rollers. The end plate also has joined to it as by vulcanizing a rubber-like seal which engages the opposite radial member (inner or outer race) from the lugs. In the preferred embodiment the seal also fills the space between the lugs so as to complete the protection.

4 Claims, 11 Drawing Figures

3,752,543

ROLLER HAVING RETAINING END PLATE AND SEAL

DISCLOSURE OF INVENTION

The invention relates to an improved roller and especially to an improved retaining end plate and seal for a full complement anti-friction roller.

The invention is applicable to a variety of bearings in which the outer race also performs the function of a roller, and the inner race may be hollow and may function with a shaft, or may be part of a shaft or stud. In the invention either the outer or the inner race laterally of the ends of the bearing rollers is provided with an annular groove or recess facing toward the other race, which serves as a locking groove for the retaining end plate and seal. The retaining end plate is of stamped construction and has spring lugs projecting into the annular groove and serving to hold the retaining end plate against the thrust of the bearing rollers.

A rubber-like seal is bonded to the retaining end plate to contact the opposite race from the annular recess and in the preferred embodiment it also fills the space between the spring lugs and thus engages the race contacted by the spring lugs.

A purpose of the invention is to obtain more protection against end thrust in the retaining end plate of a full complement bearing roller.

A further purpose is to avoid the tedious and expensive method of production heretofore used on the retaining end plates.

A further purpose is to permit better locking of a retaining end plate and so permit the use of thicker gauge material.

In the drawings I show several embodiments of the invention, choosing the forms illustrated from the standpoints of convenience in illustration, satisfactory operation and clear demonstration of the principles involved.

In the prior art at the present time full complement rollers are used with retaining end plates which in some cases have an annular groove into which a spring wire of polygonal form fits and locks in the groove. This retainer also has engaging the opposite race from that in which the wire is secured, an O-ring fitting in a groove. These retaining end plates of the prior art are machined parts, hardened and ground, and are very expensive to produce and tedious to install.

Attempts have been made in the prior art to make fluid seals for bearings which involved a metal stamping having an axial flange joined to a rubber-like material, the metal flange springing to move in a groove of a housing. Workman, U.S. Pat. No. 2,915,345, granted Dec. 1, 1959, for Fluid Seal. The attempt to apply this principle to a retaining end plate holding in place the bearing roller of a full complement roller has not met with success since the metal gauge of the stamping must be so light to permit its spring function in that configuration that the device does not have sufficient strength to resist thrust of the bearing rollers.

In the present invention a robust stamped retaining end plate is permitted, since the lugs by their lateral subdivision have adequate compliance to permit insertion without undue force. Accordingly, the part can be fabricated without appreciable machining and installed very easily in the roller combination.

Figure 1:
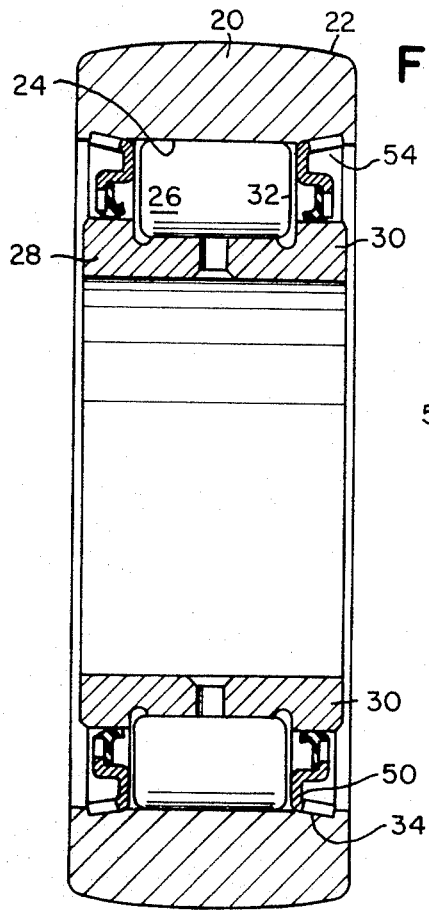
FIG. 1 is an axial section of a full complement roller according to the invention.
Figure 2:
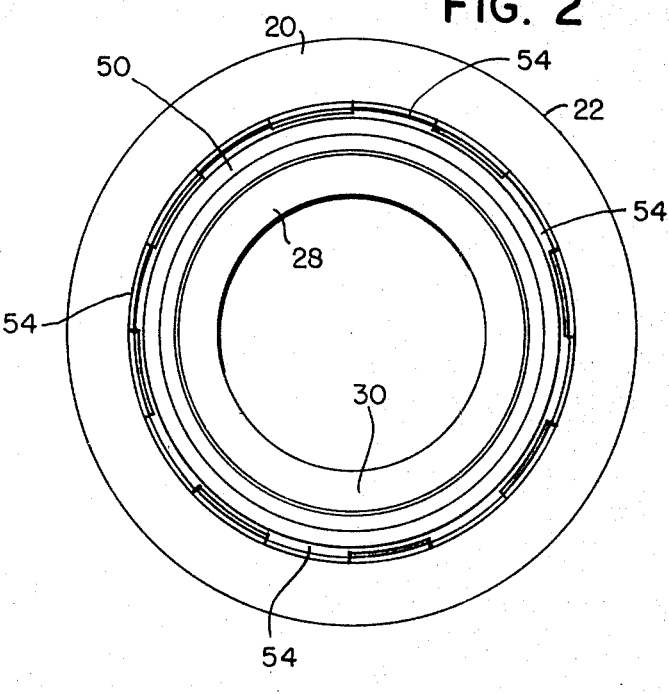
FIG. 2 is an end view of the full complement roller of FIG. 1.
Figure 6:
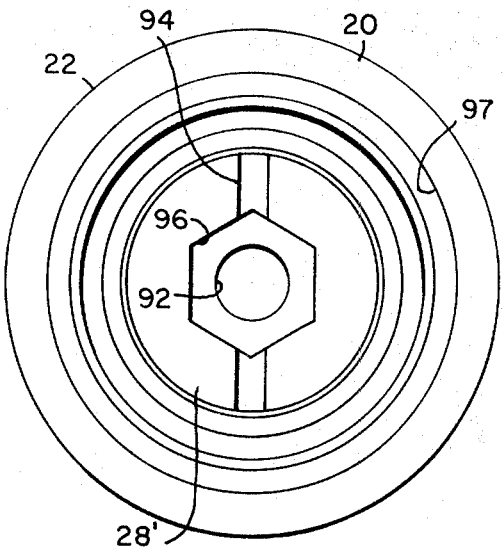
FIG. 6 is a view of a variation in end elevation.
Figure 7:
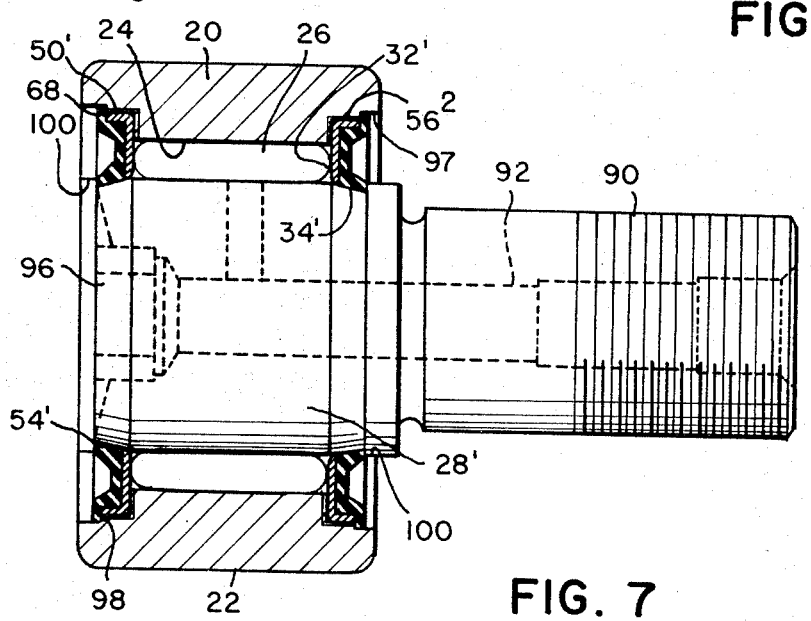
FIG. 7 is an axial section of FIG. 6.
Figure 8:
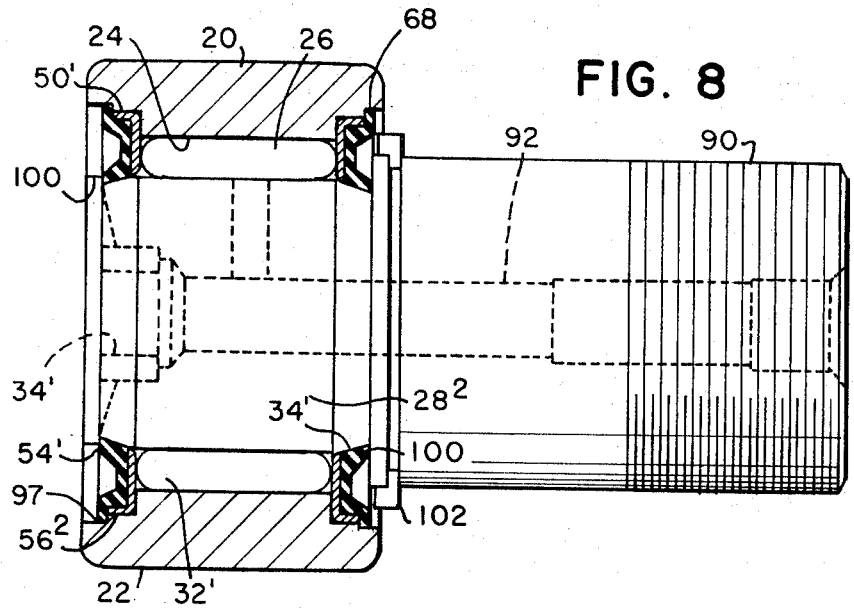
FIG. 8 is a view corresponding to FIG. 7 showing a variation.

In FIGS. 1 and 2 an outer roller 20 which may be a carriage roller, mast roller, cam roller, track roller, toothless sprocket or the like (herein called a "track" roller) as well known in the art has outside an endless track surface 22 and inside, a raceway 24 on which run bearing rollers 26 of a full complement bearing in the sense that each bearing roller is in contact or generally in contact with two rollers at the sides. The bearing rollers run on an inner race 28 which as shown for example is hollow in FIGS. 1 and 2 and 9 or which may be as shown in FIGS. 6, 7 and 8 a shaft or stud as later explained. The inner race has suitable lubrication openings.

In the forms of FIGS. 1 to 5 the bearing rollers have blunt ends 32 and are retained endwise by a flange 30 which is integral with the inner raceway, while in the forms of FIGS. 6 to 9 the bearing rollers have curved ends 32' and are retained endwise solely by the end retaining plate of the present invention. In either case the retaining end plates confine the rollers endwise and take the thrust of the outer race of the track roller.

Figure 3:
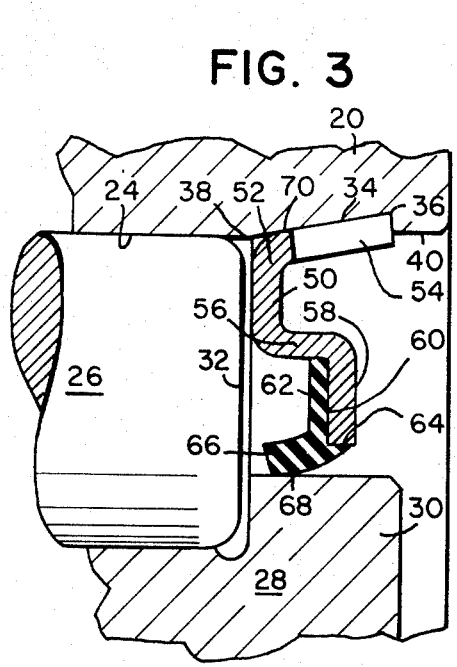
FIG. 3 is an enlarged fragmentary view of a portion of FIG. 1 illustrating one form of the retaining end plate of the present invention.

The track roller has an annular groove 34 on its side opposite the inner race in the form of FIGS. 1 to 5, this groove having a depth 36 remote from the bearing rollers which is a maximum and merging at 38 over a taper as shown, to the diameter of the outer bearing race, providing a recess or groove for the retainer. At 40 on the ends the diameter of the inside of the track roller is preferably larger than the diameter of the outer bearing race, although it can optionally be the same as the outer bearing race, providing adequate anchorage for the retaining end plate is obtained. An end plate 50 as shown in FIG. 3 consists of a metal stamping which has a retainer end wall 52 which is preferably a ring at right angles to the axis, from which stem a plurality of circumferentially distributed spaced spring lugs 54 whose normal position is diagonally out from the axis and so have a locking tendency when inserted into the groove 34. The ends of the lugs 54 abut the deepest part of the groove at 36. These lugs are adequately spaced so that they will not interfere and they may have the spacing shown in FIGS. 10 and 11 in a slightly different form. By choosing the desired width for the lugs, the spring force to be overcome in inserting the lugs into the recess 34 can be selected, and the force retaining the lugs into the recess 34 correspondingly chosen. The ring has a tubular wall 56 at its radial inside from which it is deflected in another ring 58 still further to the inside.

The ring 58 in FIG. 3 has adhering to its endwise surface 60 nearest the ends of the bearing rollers rubber-like material 62 which is also adhering to the radial inner edge 64 of the stamping and has an inwardly annular lip 66 deflected toward the ends of the bearing rollers and exerting sealing pressure on the upper edge of the flange 30 at 68 as shown in FIG. 3. In order to accomplish the bonding between the rubber-like material and the metal stamping which will preferably be epoxy-coated or of steel, the steel may be brass plated if desired and any of the well-known techniques for obtaining a bond between rubber and metal may be used in any of the forms of this invention. It will be evident of course that a rubber preferably will be vulcanized in contact with the metal to achieve a firm bond in the various forms.

In operation therefore when the end plate is inserted axially to the position shown in FIG. 3 to lock the lugs in the groove 34, the end plate serves to hold the track roller from shifting longitudinally with respect to the bearing rollers and the inner bearing race while a seal is accomplished at 70 at the outside between the track roller and the end plate on the base of the lugs and a seal is accomplished at 68 between the rubber-like sealing material and the inner bearing race.

Figure 4:
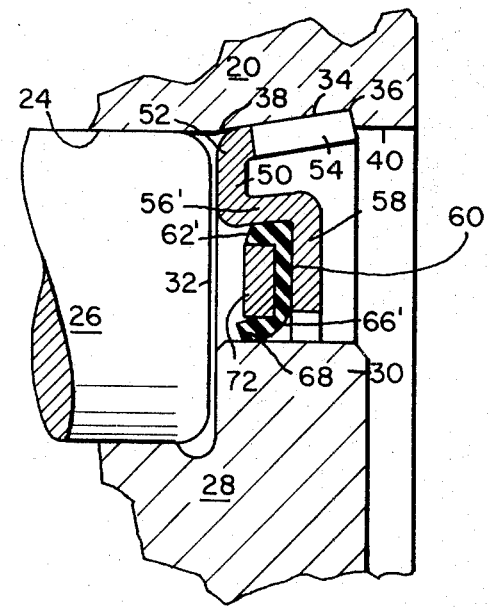
FIG. 4 is a view similar to FIG. 3 illustrating another form of retaining end plate of the invention.

In FIG. 4 the end plate may be substantially the same as shown in FIG. 3, except that the ring like portion 52 is narrower, and the tubular portion 56' is inwardly tapering as it progresses toward the ends of the bearing rollers, making a pocket into which the rubber-like material 62' is adhered and locked, at the same time adhering to the ring portion 58. The side of the rubber-like material remote from the ring portion 58 has co-molded and adhering to it a metal ring 72 which strengthens and stiffens the side of the inner projecting rubber-like material 66' which is toward the ends of the bearing rollers. The sealing lip 66' projects radially inward.

Figure 5:
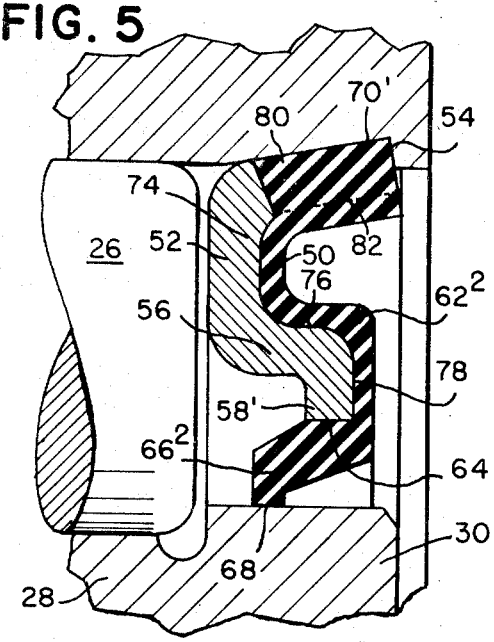
FIG. 5 is a view corresponding to FIG. 3 showing the preferred embodiment of the invention.

FIG. 5 shows a preferred end plate 50 which may be the same as that of FIGS. 3 and 4 except that the ring 58 has a shortly radial extent. In this form the rubber-like material $62^2$ is preferably molded and adhering over the surface 74 of the ring 52 remote from the bearing rollers, over the outside surface 76 of the tubular portion 56, over the end surface 78 remote from the bearing rollers and over the inner edge 64 of the end plate. An annular lip $66^2$ is formed of the rubber-like material on the inside projecting beyond the end plate and this engages the flange 30 at 68.

The particular distinctive feature of the embodiment of FIG. 5, which is the preferred embodiment, is that it also has rubber-like material at 80 adhering to the sides of the lugs and extending at 82 continuously on the radial inner side of the lugs. Thus, with the lugs themselves in this form a sealing edge 70' is formed which seats in the tapering recess all around the end plate.

The principles of the invention can be equally well applied to a roller such as a cam roller in which the lugs 54' hold the end plate on the recess on the inside of the inner race and also hold the track roller on the outside against shifting its position axially as shown in FIGS. 6 to 9. In FIGS. 6 to 8 the inner race $28^1$ or $28^2$ (differing simply in the size of the stud) has threads 90 on the end as well known to anchor the cam roller, has interior lubricating passages 92 (which may be plugged at either end as desired) and has at the outer end a screwdriver groove 94 and a wrench engaging portion 96.

Figure 9:
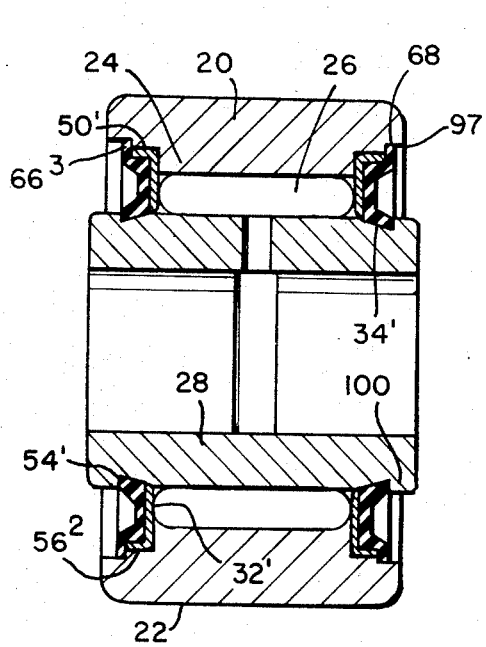
FIG. 9 is a view corresponding to FIG. 7 showing a further variation.
Figures 10, 11:
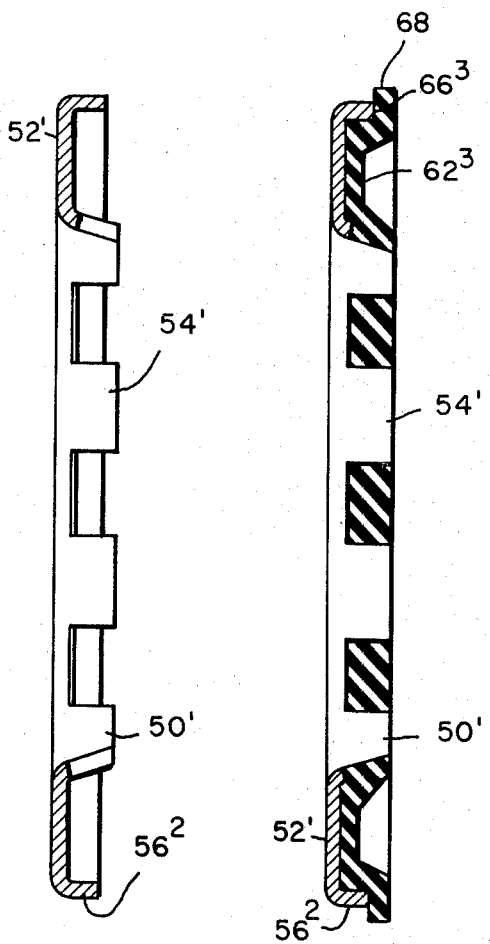
FIG. 10 is an axial section of the metal stamping for the retaining end plate used in FIGS. 6 to 9.
FIG. 11 is an axial section of the complete retaining end plate and seal as used in FIGS. 6 to 9.

The end plate 50' is a reversal of the end plate previously described in that it has spaced lugs 54' around the inside of the periphery diverging from the axis radially inwardly and spaced from one another as best seen in FIGS. 10 and 11. At the radial outside the end plate has a tubular axial flange $56^2$ projecting from the end ring 52'. Over the side of the channel-like section and between the lugs as best seen in FIG. 11, there is a rubber-like layer $62^3$ which extends over the radial inside of the portion $56^2$ and its end, the face of the ring 52' remote from the bearing rollers, the radial outside of the lugs 54' and the space between the lugs. It also projects at $66^3$ to form a radial lip around the outside which engages and seals at 68 in a ring recess 97 on the end of the track roller and outer race beyond a shoulder 98. The annular recess 34' in the inner race or shaft has a tapering portion as already described which conforms to the lugs in expanded position and has an abutment portion 100 which prevents dislodgment and which may be an annular boss on the shaft as in FIG. 7 or FIG. 8 or an extension of the inner race as in FIG. 9. For additional support a snap ring 102 is provided in FIG. 8. It will be understood that the end plate and seal is preferably used at both ends of the bearing rollers, but it may be used on one end of the bearing rollers only, using some other type of end plate at the other ends of the bearing rollers.

In assembling the structure of FIGS. 6, 7 and 9, the bearing rollers may be assembled on either the inner or outer races, the other race pushed on from the end and then both end plates and seals pushed on from the opposite ends, and their end lugs locked in the annular groove, which in this case is on the inner race and faces toward the outer race. In assembling the structure of FIG. 8, the end plate and seal nearest the threads 90 is first assembled on the shaft or stud forming the inner race, and the bearing rollers are assembled on either the inner race or the outer race and the other race pushed on from the end and then the other end plate and seal is inserted in place.

It will be understood that while in the form of FIGS. 1 to 5 the end plate holds the track roller in position with respect to the bearing rollers and the flange 30 holds the bearing rollers in position with respect to the inner race, in the form of FIGS. 6 to 11 the end thrust of the bearing rollers and also of the track roller is the responsibility of the end plate or plates, the sealing function being additionally performed by the seal.

In view of my invention and disclosure, variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

Having thus described my invention, what I claim as new and desire to secure by Letters Patent is:

1. A self-contained antifriction roller comprising an outer track roller having on the inside a roller bearing race, an inner bearing race opposite from the outer bearing race and within it, a plurality of full complement bearing rollers riding on the outer race and the inner race, an annular locking recess on the end of one of the races facing toward the other race beyond the end of the bearing roller, a resilient metallic end plate having a ring portion contacting the ends of the bearing rollers and supporting thrust loads on the outer race of rollers against the inner race in both directions, having adjoining the locking recess and disposed away from the bearing rollers a plurality of annularly distributed metallic spring lugs which protrude from the ring and which engage in the recesses, the lugs having their greatest depth remote from the end of the bearing rollers and tapering to a minimum depth adjoining the end of the bearing rollers, and rubber-like material adhering to the end plate, intruding between the lugs, and forming with the lugs a continuous seal at the locking recess and having at the opposite end a molded on annular lip extending continuously around the circumference and engaging and sealing on the race opposite to the race which has the locking recess, the rubber-like material being omitted from the ring at the end adjoining the bearing rollers.

2. A roller of claim 1, in which the locking recess is in the track roller and the lugs engage in it.

3. A roller of claim 1, in which the locking recess is in the inner race and the lugs engage in it.

4. A roller of claim 1, having a tubular portion on the side away from the ends of the bearing rollers adhering to the rubber-like material remote from the bearing rollers, the radial outside of the tubular portion of the end plate and the face of the annular portion remote from the bearing rollers.

* * * * *